United States Patent
Hedges et al.

(10) Patent No.: US 11,326,378 B2
(45) Date of Patent: May 10, 2022

(54) LATCH AND METHOD FOR OPERATING SAID LATCH

(71) Applicant: Rohr, Inc., Chula Vista, CA (US)

(72) Inventors: Nicholas Hedges, Carlsbad, CA (US); David L. Lipson, Chula Vista, CA (US); Hugo Almaraz, San Juan Capistrano, CA (US); Manuel H. Chumiso, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 345 days.

(21) Appl. No.: 16/430,979

(22) Filed: Jun. 4, 2019

(65) Prior Publication Data
US 2020/0386022 A1    Dec. 10, 2020

(51) Int. Cl.
| | |
|---|---|
| *E05C 19/14* | (2006.01) |
| *B64D 29/06* | (2006.01) |
| *E05B 1/00* | (2006.01) |
| *E05B 41/00* | (2006.01) |
| *E05B 63/06* | (2006.01) |

(52) U.S. Cl.
CPC ............ *E05C 19/145* (2013.01); *B64D 29/06* (2013.01); *E05B 1/00* (2013.01); *E05B 41/00* (2013.01); *E05B 63/06* (2013.01); *E05C 19/14* (2013.01); *Y10T 292/216* (2015.04)

(58) Field of Classification Search
CPC ... Y10T 292/216; E05C 19/14; E05C 19/145; B64D 29/06
See application file for complete search history.

(56) References Cited

U.S. PATENT DOCUMENTS

| | | | | |
|---|---|---|---|---|
| 2,703,431 A | * | 3/1955 | Tatom | B64D 29/06 16/258 |
| 2,714,032 A | * | 7/1955 | Mills | B60J 9/02 292/247 |
| 2,896,751 A | | 7/1959 | Henrichs | |
| 2,904,141 A | | 9/1959 | Henrichs | |

(Continued)

FOREIGN PATENT DOCUMENTS

| | | | | |
|---|---|---|---|---|
| DE | 3244086 A1 | * | 5/1984 | ............ E05C 19/14 |
| EP | 0585952 A2 | * | 3/1994 | ........... E05C 19/145 |

(Continued)

OTHER PUBLICATIONS

EP search report for EP19212395.8 dated Jun. 23, 2020.

*Primary Examiner* — Carlos Lugo
(74) *Attorney, Agent, or Firm* — Getz Balich LLC (57) ABSTRACT

A latch includes a latch housing including a first housing portion and a second housing portion separable from the first housing portion. The second housing portion includes a keeper. A first arm member is in rotational communication with the first housing portion. The first arm member is configured to rotate about a first axis between a first position and a second position. A second arm member is in rotational communication with the first arm member. A latch load pin is in rotational communication with the first arm member about a second axis. The latch load pin is configured to mate with the keeper with the first arm member in the first position. The second arm member in the first position is configured to be fixed relative to the first arm member as the first arm member rotates from the first position toward the second position.

19 Claims, 12 Drawing Sheets

(56) References Cited

U.S. PATENT DOCUMENTS

| | | | |
|---|---|---|---|
| 4,218,081 A * | 8/1980 | Johnson | E05C 19/14 |
| | | | 292/66 |
| 4,352,513 A * | 10/1982 | Gunther | E05C 19/14 |
| | | | 292/107 |
| 4,385,423 A * | 5/1983 | Vermilye | E05C 19/14 |
| | | | 24/68 R |
| 4,858,970 A * | 8/1989 | Tedesco | E05C 19/145 |
| | | | 292/113 |
| 5,152,559 A * | 10/1992 | Henrichs | B64D 29/06 |
| | | | 292/113 |
| 5,620,212 A | 4/1997 | Bourne et al. | |
| 5,984,382 A | 11/1999 | Bourne et al. | |
| 6,279,971 B1 | 8/2001 | Dessenberger, Jr. | |
| 9,945,150 B2 | 4/2018 | Aten et al. | |
| 9,988,157 B2 | 6/2018 | Lee et al. | |
| 10,137,996 B2 * | 11/2018 | Mellor | B64D 29/06 |
| 10,173,782 B2 * | 1/2019 | Hernandez | B64D 29/06 |
| 2008/0129056 A1 * | 6/2008 | Hernandez | E05B 63/143 |
| | | | 292/98 |
| 2016/0347465 A1 | 12/2016 | Mellor | |
| 2017/0260782 A1 * | 9/2017 | Kim | B64D 29/06 |
| 2018/0128028 A1 | 5/2018 | Hernandez | |

FOREIGN PATENT DOCUMENTS

| | | | | |
|---|---|---|---|---|
| FR | 722536 A * | 3/1932 | | E05C 19/14 |
| FR | 981093 A * | 5/1951 | | E05C 19/145 |
| FR | 1517988 A * | 3/1968 | | E05C 19/145 |
| FR | 1528891 A * | 6/1968 | | E05C 19/145 |
| GB | 191421750 A * | 10/1915 | | E05C 19/14 |

\* cited by examiner

LATCH AND METHOD FOR OPERATING SAID LATCH

BACKGROUND

1. Technical Field

This disclosure relates generally to latches, and more particularly to latches for securing cowl doors.

2. Background Information

Modern aircraft gas turbine engines may include a nacelle configured to house the engine and other auxiliary systems. The nacelle may include one or more cowl sections associated with particular sections of the gas turbine engine. For example, the nacelle may include a fan cowl or a thrust reverser cowl. The cowl sections may include one or more cowl doors configured to provide access to internal gas turbine engine components. For example, the fan cowl may include two, hinged cowl doors to provide access to the fan case, FADEC and other components in proximity to the fan case.

To provide an effective cowl load path and safety redundancy, multiple latches may be used to secure the cowl doors together in a closed position. In cases where aerodynamic or fire seals are required between the cowl doors, the latches are required to overcome the seal stiffness during the latch closing procedure. In many cases, the latch handle capability and latch length is sized by the latch closing requirements, latch pre-load requirements, and seal compressibility. In these cases, a longer latch handle provides a greater mechanical advantage for the operator.

Further, growing concern over inadvertent opening of fan cowls during flight has driven additional requirements regarding visibility of latch handle positions (engaged/disengaged). For example, it may be desirable for latch handle positions to be clearly visible during a pilot's pre-flight walk around. Accordingly, an improved latch which addresses one or more of the above concerns would find utility.

SUMMARY

According to an embodiment of the present disclosure, a latch includes a latch housing including a first housing portion and a second housing portion separable from the first housing portion. The second housing portion includes a keeper. A first arm member is in rotational communication with the first housing portion. The first arm member is configured to rotate about a first axis between a first position and a second position. A second arm member is in rotational communication with the first arm member. The second arm member is configured to rotate with respect to the first arm member between a first position and a second position. A latch load pin is in rotational communication with the first arm member about a second axis. The latch load pin is configured to mate with the keeper with the first arm member in the first position. The second arm member in the first position is configured to be fixed relative to the first arm member as the first arm member rotates from the first position toward the second position.

In the alternative or additionally thereto, in the foregoing embodiment, the first arm member includes a first end and a second end opposite the first end. The first arm member is coupled to the second arm member at the first end and the latch load pin at the second end.

In the alternative or additionally thereto, in the foregoing embodiment, the first arm member is connected to the first housing portion with a connection member. The connection member is in rotational communication with the first arm member about the first axis and in rotational communication with the first housing portion about a third axis.

In the alternative or additionally thereto, in the foregoing embodiment, the first axis is between the second axis and the second end of the first arm member along a length of the first arm member.

In the alternative or additionally thereto, in the foregoing embodiment, the first, second, and third axes are substantially parallel.

In the alternative or additionally thereto, in the foregoing embodiment, the first arm member includes a stop configured to prevent rotation of the second arm member with respect to the first arm member past the first position in a direction of rotation away from the second position of the second arm member.

In the alternative or additionally thereto, in the foregoing embodiment, the second arm member includes a lock configured to mate with the second housing portion when the second arm member is in the second position.

In the alternative or additionally thereto, in the foregoing embodiment, the keeper is linearly adjustable between a first keeper position and a second keeper position with respect to the first housing portion.

In the alternative or additionally thereto, in the foregoing embodiment, the first arm member has a first direction of rotation from the first position to the second position of the first arm member and the second arm member has a second direction of rotation from the first position to the second position of the second arm member and the first direction of rotation is opposite the second direction of rotation.

In the alternative or additionally thereto, in the foregoing embodiment, the second arm member has a first end and a second end opposite the first end. The second arm member is in communication with the first arm member at the first end.

In the alternative or additionally thereto, in the foregoing embodiment, with the first arm member in the first position and the second arm member in the first position, the second end of the first arm member is a first distance from the first axis and the second end of the second arm member is a second distance from the first axis greater than the first distance.

According to another embodiment of the present disclosure, a nacelle for a gas turbine engine having an axial centerline is disclosed. The nacelle includes a first cowl door rotatable about a first hinge, a second cowl door rotatable about a second hinge, and a latch configured to secure the first cowl door to the second cowl door when the latch is in an engaged condition. The latch includes a latch housing including a first housing portion and a second housing portion separable from the first housing portion. The first housing portion is mounted to the first cowl door and the second housing portion is mounted to the second cowl door. The second housing portion includes a keeper. A first arm member is in rotational communication with the first housing portion. The first arm member is configured to rotate about a first axis between a first position and a second position. A second arm member is in rotational communication with the first arm member. The second arm member is configured to rotate with respect to the first arm member between a first position and a second position. A latch load pin is in rotational communication with the first arm member about a second axis. The latch load pin is configured to mate with the keeper with the first arm member in the first position. The second arm member in the first position is configured to be fixed relative to the first arm member as the first arm member rotates from the first position toward the second position.

In the alternative or additionally thereto, in the foregoing embodiment, the load pin is configured to pull the second housing portion towards the first housing portion as the first arm member rotates from the first position to the second position.

In the alternative or additionally thereto, in the foregoing embodiment, an exterior surface of the second arm member forms a portion of an exterior surface of the nacelle when the latch is in the engaged condition.

In the alternative or additionally thereto, in the foregoing embodiment, the second arm member includes a lock configured to mate with the second housing portion when the second arm member is in the second position.

In the alternative or additionally thereto, in the foregoing embodiment, the lock is configured to mate with the second housing portion when the second arm member is in the second position and the load pin is mated with the keeper.

In the alternative or additionally thereto, in the foregoing embodiment, the keeper is linearly adjustable between a first keeper position and a second keeper position with respect to the first housing portion.

In the alternative or additionally thereto, in the foregoing embodiment, the second housing portion further includes an adjustment feature in communication with the keeper. The adjustment feature is rotatable between a first adjustment position and a second adjustment position and rotation of the adjustment feature from the first adjustment position to the second adjustment position moves the keeper from the first keeper position to the second keeper position.

In the alternative or additionally thereto, in the foregoing embodiment, the adjustment feature is configured to be operated from both of a first position adjacent an exterior of the second housing portion and a second position adjacent an interior of the second housing portion.

According to another embodiment of the present disclosure, a method of engaging a cowl door latch is provided. A load pin is mated with a keeper. A first arm member is rotated about a first axis from a first position to a second position. The first arm member is in rotational communication with the load pin. A second arm member is rotated with respect to the first arm member from a first position to a second position. The second arm member is in rotational communication with the first arm member and the second arm member is fixed relative to the first arm member as the first arm member rotates from the first position toward the second position.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings.

Figure 1:
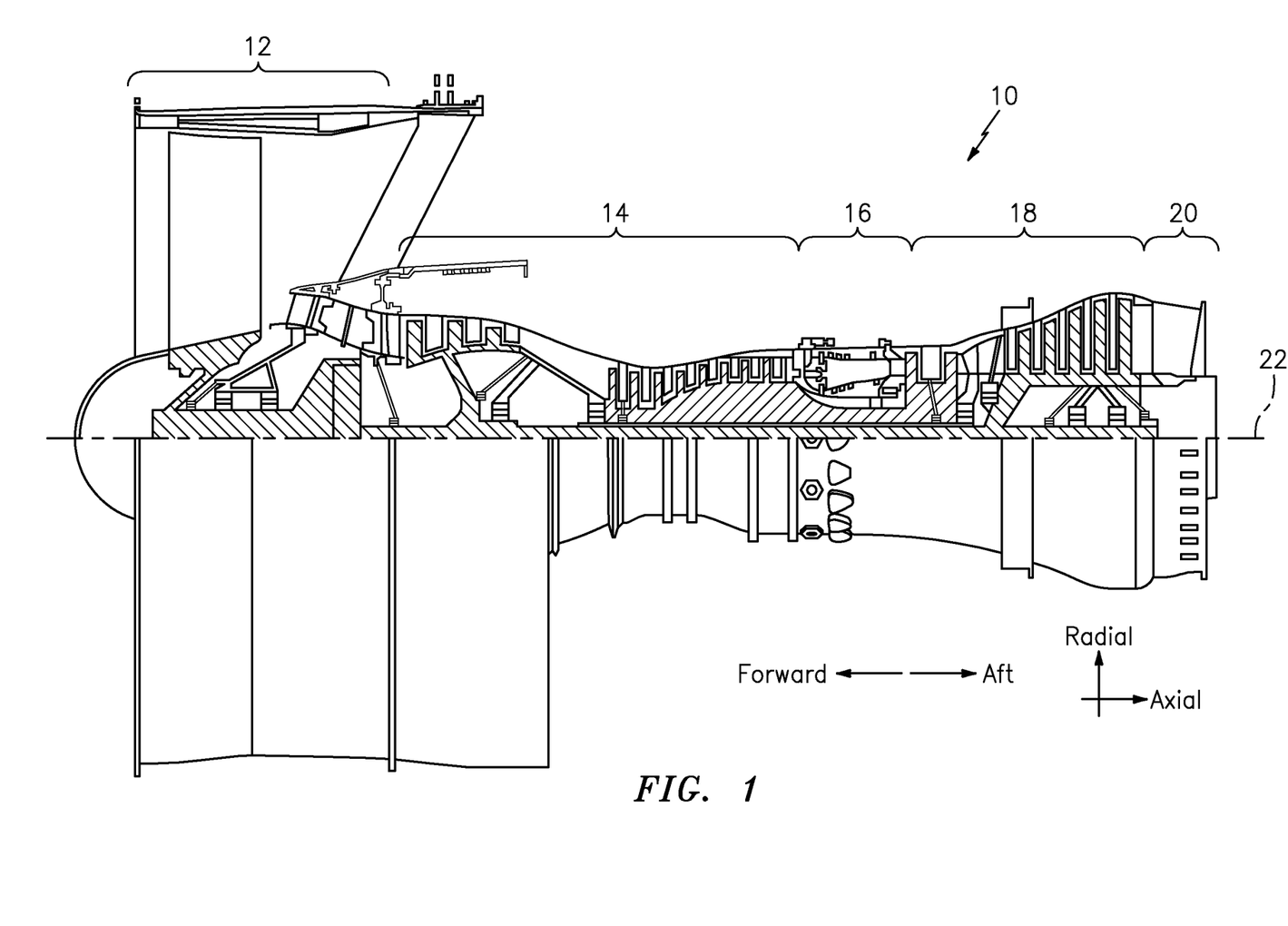
FIG. 1 illustrates a side, cross-sectional view of a gas turbine engine.
Figure 2A:
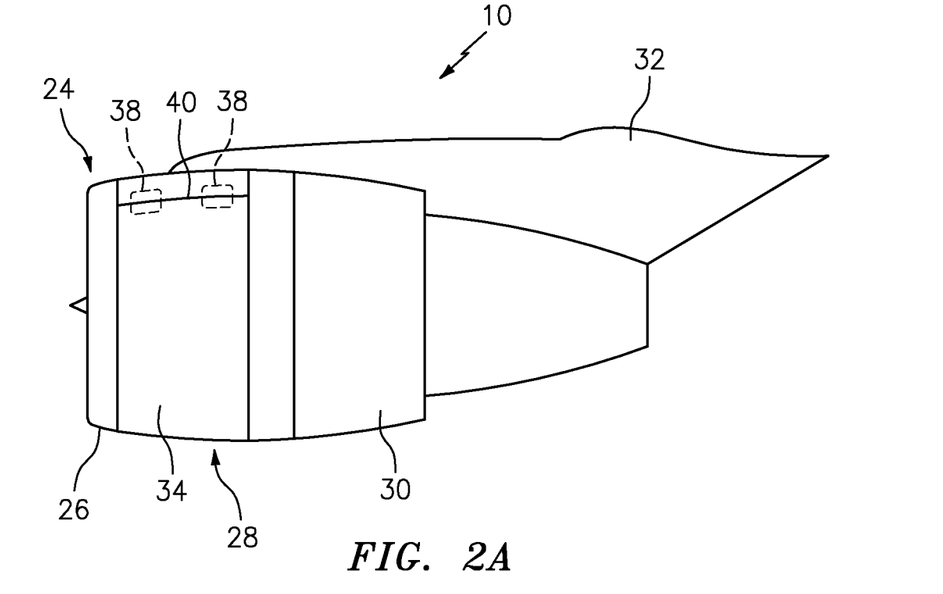
FIG. 2A illustrates a side view of a gas turbine engine nacelle.
Figure 2B:
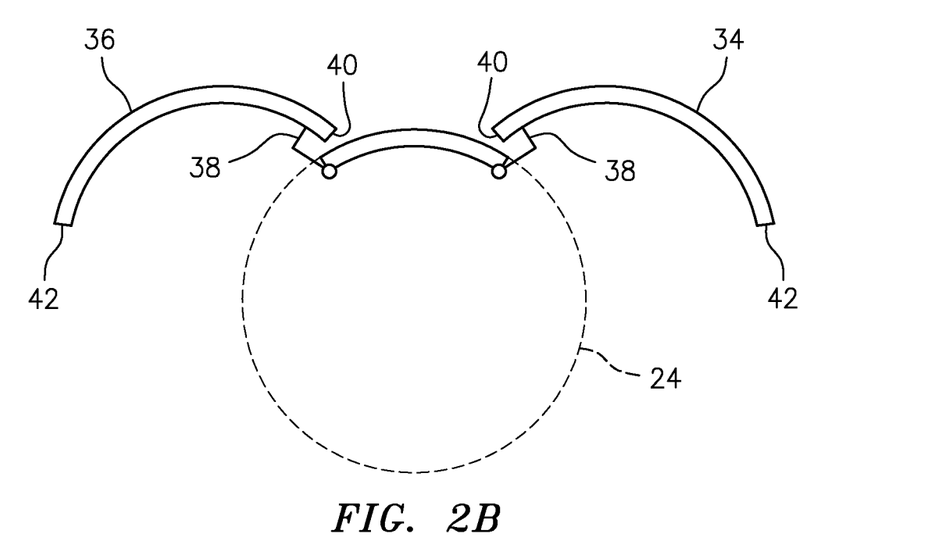
FIG. 2B illustrates a front view of the gas turbine engine nacelle of FIG. 2A.

Referring to FIGS. 1, 2A, and 2B, a gas turbine engine 10 generally includes a fan section 12, a compressor section 14, a combustor section 16, a turbine section 18, and an exhaust section 20 disposed about an axial centerline 22. The gas turbine engine 10 further includes a nacelle 24 defining an exterior housing of the gas turbine engine 10 about the axial centerline 22. The nacelle may include an inlet 26, a fan cowl 28, and a thrust reverser 30. The nacelle 24 may be coupled to a pylon 32 which may mount the gas turbine engine 10 to an aircraft wing or fuselage (not shown).

The fan cowl 28 and the thrust reverser 30 may include one or more cowl doors configured to provide access to internal portions of the gas turbine engine 10 for inspections and maintenance. For example, the fan cowl 28 may include a first cowl door 34 and a second cowl door 36. Each of the first and second cowl doors 34, 36 may be rotatably mounted to the nacelle 24 by one or more hinges 38 (e.g., gooseneck hinges). For example, as shown in FIGS. 2A and 2B, each of the first and second cowl doors 34, 36 may be mounted to the nacelle 24 at or proximate a top edge 40 by the hinges 38. The first and second cowl doors 34, 36 may contact one another at respective bottom edges 42 in the closed position.

As used herein, "closed position" will be used to refer to the cowl doors 34, 36 in a position so as to form a portion of a substantially continuous exterior surface of the nacelle 24 (e.g., the cowl doors 34, 36 are positioned for flight). The "open position" will be used to refer to the cowl doors 34, 36 in a position other than the closed position (e.g., the cowl doors 34, 36 are partially open, fully open, etc.). While the present disclosure will be explained with reference to cowl doors 34, 36 for the fan cowl 28, those of ordinary skill in the art will recognize that the present disclosure is also applicable to other cowl doors (e.g., thrust reverser cowl doors, core cowl doors, etc.), access panels, etc. configured to permit access to internal components of the gas turbine engine 10 or other equipment (e.g., industrial gas turbine engines, wind turbines, etc.).

Figure 3:
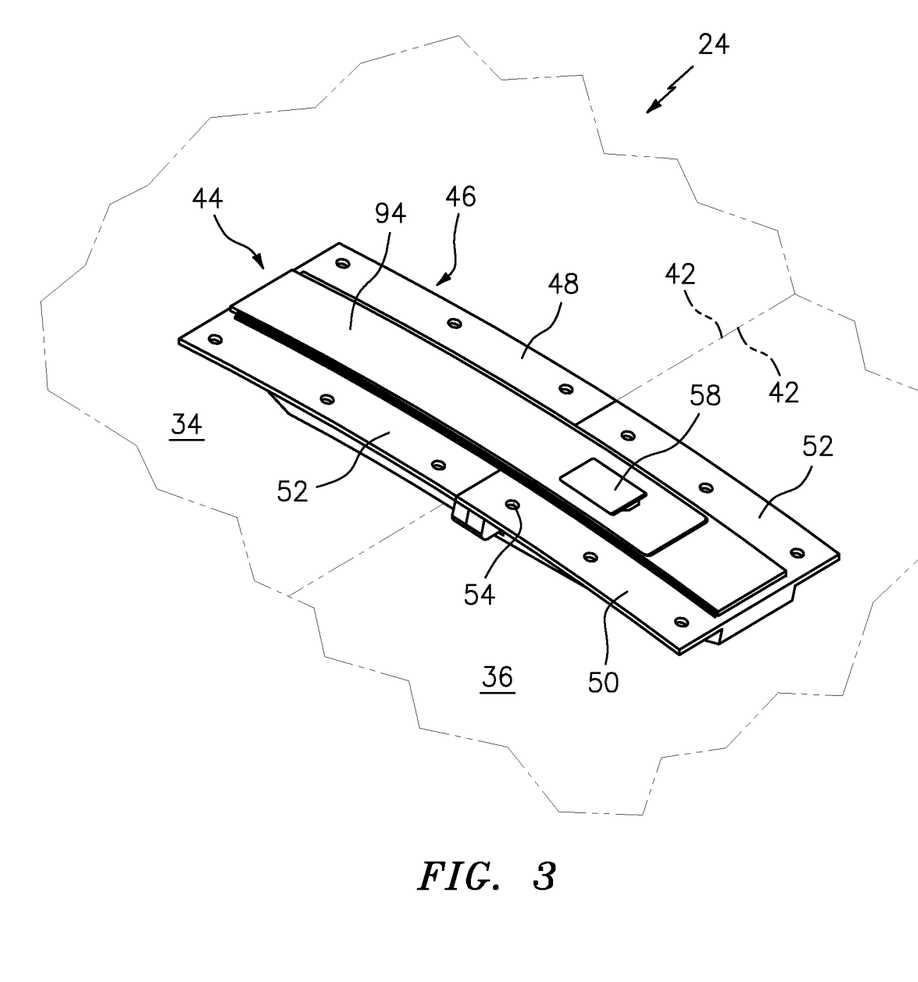
FIG. 3 illustrates a perspective view of a latch in an engaged condition.

Referring to FIG. 3, a latch 44 is illustrated in an engaged condition with the first and second cowl doors 34, 36 in the closed position. In some embodiments, the cowl doors 34, 36 may include one or more additional latches which may be the same as or different than the latch 44. The latch 44 includes a latch housing 46. The latch housing 46 includes a first housing portion 48 mounted to the first cowl door 34 and a second housing portion 50 mounted to the second cowl door 36 such that the first and second housing portions 48, 50 may substantially contact one another with the first and second cowl doors 34, 36 in the closed position (minor gaps or misalignment, within design tolerances, may exist between the respective cowl doors 34, 36 and/or the respective housing portions 48, 50). The first and second housing portions 48, 50 are separable from one another. As will be discussed in further detail, in some embodiments, the latch 44 includes a trigger 58 configured to effect, in part, a disengagement of the latch 44. As used herein, the term "engaged" with respect to the latch 44 indicates that the latch 44 is in a final condition for securing the first and second cowl doors 34, 36 in the closed position for flight. The term "disengaged" will be used to refer to the latch 44 in a condition other than the engaged condition.

Each of the first and second housing portions 48, 50 may include a mounting surface 52 configured to mate with a corresponding surface of the first and second cowl doors 34, 36, respectively. In some embodiments, the latch housing 46 may have a flanged configuration including a plurality of apertures 54 configured to allow the first and second housing portions 48, 50 to be mounted to the respective first and second cowl doors 34, 36 by a corresponding plurality of fasteners. In some other embodiments, the first and second housing portions 48, 50 may be mounted to the respective first and second cowl doors 34, 36 by welding or any other suitable mounting method.

Figure 4:
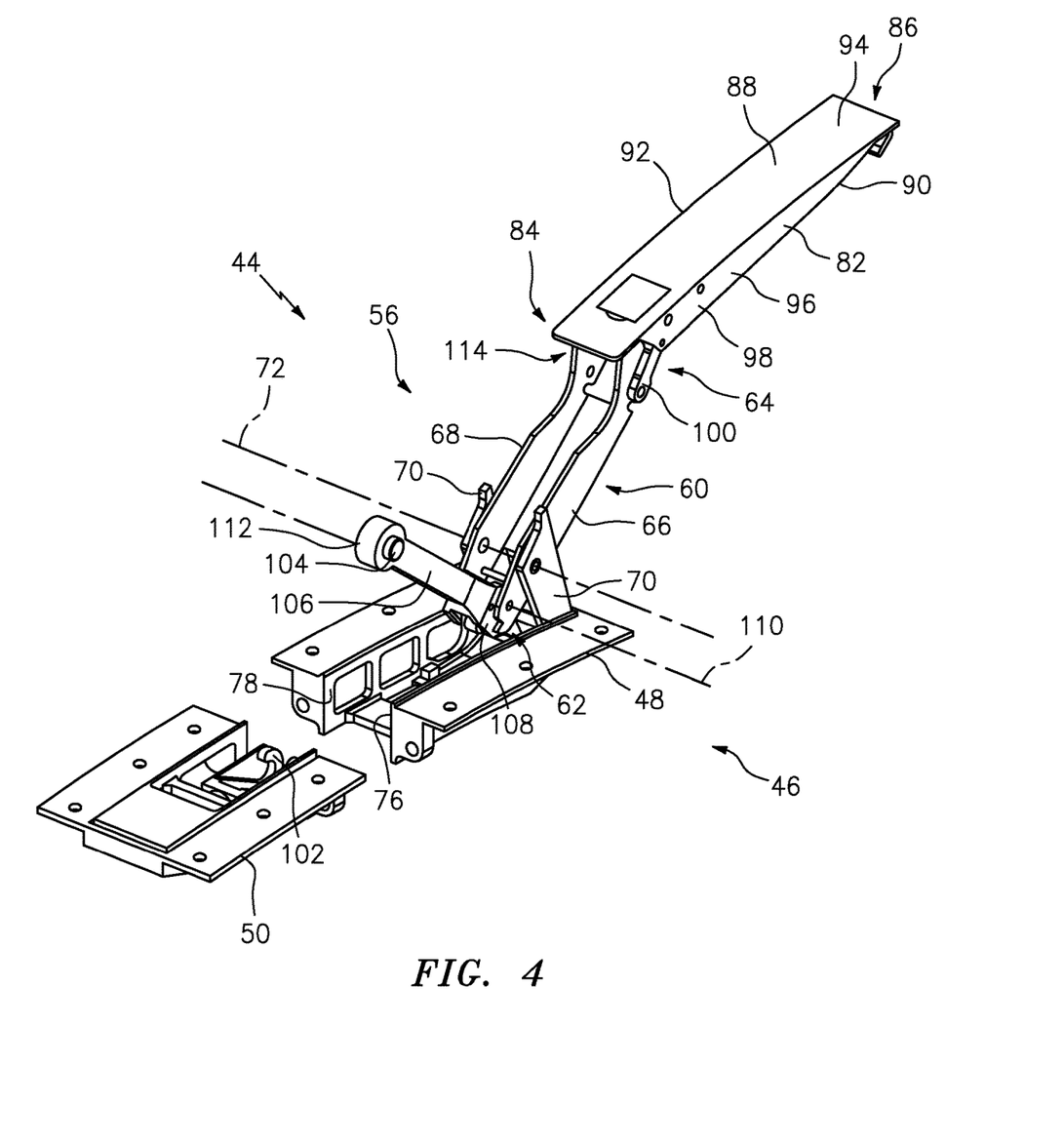
FIG. 4 illustrates a perspective view of the latch of FIG. 3 in a disengaged condition.
Figure 5:
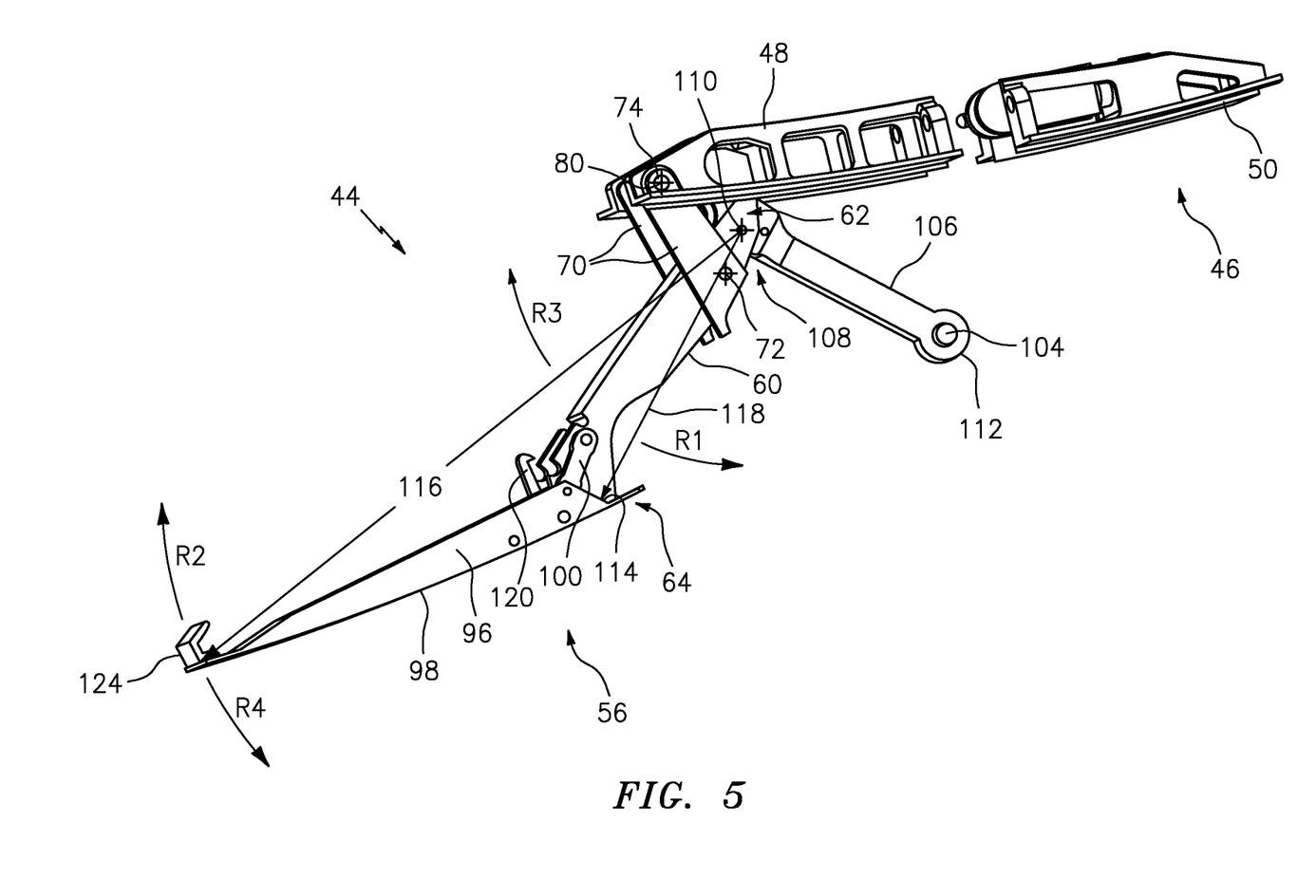
FIG. 5 illustrates a perspective view of the latch of FIG. 3 in a disengaged condition.

Referring to FIGS. 4 and 5, the latch 44 is illustrated in the disengaged condition. The latch 44 includes a latch mechanism 56 configured to secure the first housing portion 48 to the second housing portion 50, and hence the first cowl door 34 to the second cowl door 36, when the cowl doors 34, 36 are in the closed position. The latch mechanism 56 is further configured to be retained within the latch housing 46 with the latch 44 in the engaged condition. The latch mechanism 56 includes a first arm member 60 having a first end 62 and a second end 64 opposite the first end 62. The first arm member 60 may include a first portion 66 and a second portion 68 spaced from the first portion 66. The first and second portions 66, 68 may each extend between the first end 62 and the second end 64 of the first arm member 60.

Each of the first and second portions 66, 68 may be mounted to the first housing portion 48 by a respective connection member 70. The connection members 70 may be in rotational communication with the first housing portion 48 about an axis 72. For example, the connection members 70 may be in rotational communication with a pin 74 extending between a first internal surface 76 and a second internal surface 78 of the first housing portion 48. The connection members 70 may further be in rotational communication with the first arm member 60 about an axis 80. Accordingly, the first arm member 60 may be in rotational communication with the first housing portion 48, via the connection members 70, about the first axis 72. The first arm member 60 is configured to rotate about the axis 80 between a first position and a second position, wherein the second position corresponds to the engaged condition of the latch 44.

The latch mechanism 56 includes a second arm member 82 having a first end 84 and a second end 86 opposite the first end. The second arm member 82 may include a cover portion 88 having first and second sides 90, 92 each extending between the first and second ends 84, 86. As shown in FIG. 3, an exterior surface 94 of the cover portion 88 may form a portion of an exterior surface of the nacelle 24 when the latch 44 is in the engaged condition. The second arm member 82 may include transverse walls 96 spaced from one another and extending from the cover portion along each of the first and second sides 90, 92. The transverse walls 96 include an outer surface 98. In some embodiments, the outer surface 98 of the transverse walls 96 may include a distinct coloration (e.g., brightly colored paint) with respect to the other components of the latch 44 or another distinguishing form of visual indication configured to indicate to a maintenance technician or other observer that the latch 44 is in a disengaged condition. Accordingly, the outer surface 98 of the transverse walls 96 may be visible to an observer when the latch 44 is in the disengaged condition but may not be visible to the observer when the latch 44 is in the engaged condition.

The second arm member 82 is in rotational communication with the first arm member 60. For example, the second arm member 82 may be in rotational communication with the first arm member 60 at a position proximate the second end 64 of the first arm member 60 and the first end 84 of the second arm member 82. The second arm member 82 may be in rotational communication with the first arm member 60 via links 100 rotatably mounted to one or both of the first arm member 60 and the second arm member 82. The second arm member 82 is configured to rotate, with respect to the first arm member 60, between a first position and a second position, wherein the second position corresponds to the engaged condition of the latch 44. As shown in FIG. 5, the firm arm member 60 has a direction of rotation R1 (e.g., clockwise) about the axis 72 between the first position and the second position of the first arm member 60. The second arm member 82 may have a direction of rotation R2 which is opposite that of the direction of rotation R1 (e.g., counter-clockwise) between the first position and the second position of the second arm member 82.

The second housing portion 50 includes a keeper 102. The keeper 102 may be configured as one or more hooks. The latch mechanism 56 includes a corresponding load pin 104 configured to mate with the keeper 102. The load pin 104 is in rotational communication with the first arm member 60 via an extension element 106. The extension element 106 has a first element end 108 rotatably mounted to the first arm member 60 about an axis 110. The extension element 106 may be rotatably mounted to the first arm member 60 proximate the first end 62 of the first arm member 60, for example, between the first and second portions 66, 68 of the first arm member 60. The extension element 106 has a second element end 112 coupled to the load pin 104. In some embodiments, the second element end 112 may encompass a perimeter of the load pin 104, wherein the load pin has a length that is perpendicular to a length of the extension element 106. In some embodiments, two or more of the axes 72, 80, 110 may be substantially parallel. As used herein, the term "substantially" with regard to an angular relationship refers to the noted angular relationship +/−5 degrees.

The axis 72 may be disposed between the axis 110 and the second end 64 of the first arm member 60 along a length of the first arm member 60. Accordingly, rotation of the first arm member 60 in a direction of rotation R3 about the axis 72, in a direction opposite the direction of rotation R1, may cause the load pin 104 to move towards the keeper 102 of the second housing portion 50 thereby allowing an operator to mate the load pin 104 with the keeper 102. Once the load pin 104 and the keeper 102 are mated, rotation of the first arm member 60 in the direction of rotation R1 may cause the load pin 104 to pull the second housing portion 50, via the keeper 102, towards the first housing portion 48 and, hence, pull the second cowl door 36 towards the first cowl door 34. The first position of the first arm member 60 may be defined by the position at which the load pin 104 has mated with the keeper 102 with no force yet applied to pull the second cowl door 36 towards the first cowl door 34.

The second end 64 of the first arm member 60 may form a stop 114 configured to prevent rotation of the second arm member 82 past the first position of the second arm member 82 in a direction of rotation R4 away from the second position of the second arm member 82. The first position of the second arm member 82 may be defined by the position of the second arm member 82 with respect to the first arm member 60 where the second arm member 82 contacts the stop 114. Thus, the second arm member 82 may extend generally outward from the first arm member 60 with respect to the axis 72. An operator applying a force to the second end 86 of the second arm member 82, to rotate the second arm member 82 in the direction of rotation R4 would cause the second arm member 82 to encounter the stop 114, thereby causing the first arm member 60 to rotate in the direction of rotation R1, for example, from the first position to the second position of the first arm member 60. Accordingly, the second arm member 82 in the first position of the second arm member 82 may be configured to be fixed relative to the first arm member 60 as the first arm member 60 rotates from the first position toward the second position of the first arm member 60.

The second end 64 of the first arm member 60 in the first position has a radius 116 with respect to the axis 110 (i.e., a length between the second end 64 and the axis 110). The second end 86 of the second arm member 82 in the first position may have a radius 118, with respect to the axis 110, which is greater in length than the radius 116. In some embodiments, the length of radius 118 may be greater than twice the length of the radius 116. Accordingly, as one of ordinary skill in the art will appreciate, rotation of the first arm member 60 from the first position to the second position of the first arm member 60 by applying a force to the second arm member 82 in the direction of rotation R4 may provide an operator with a greater mechanical advantage when pulling the second cowl door 36 towards the first cowl door 34 via the load pin 104 and the keeper 102.

Figure 6:
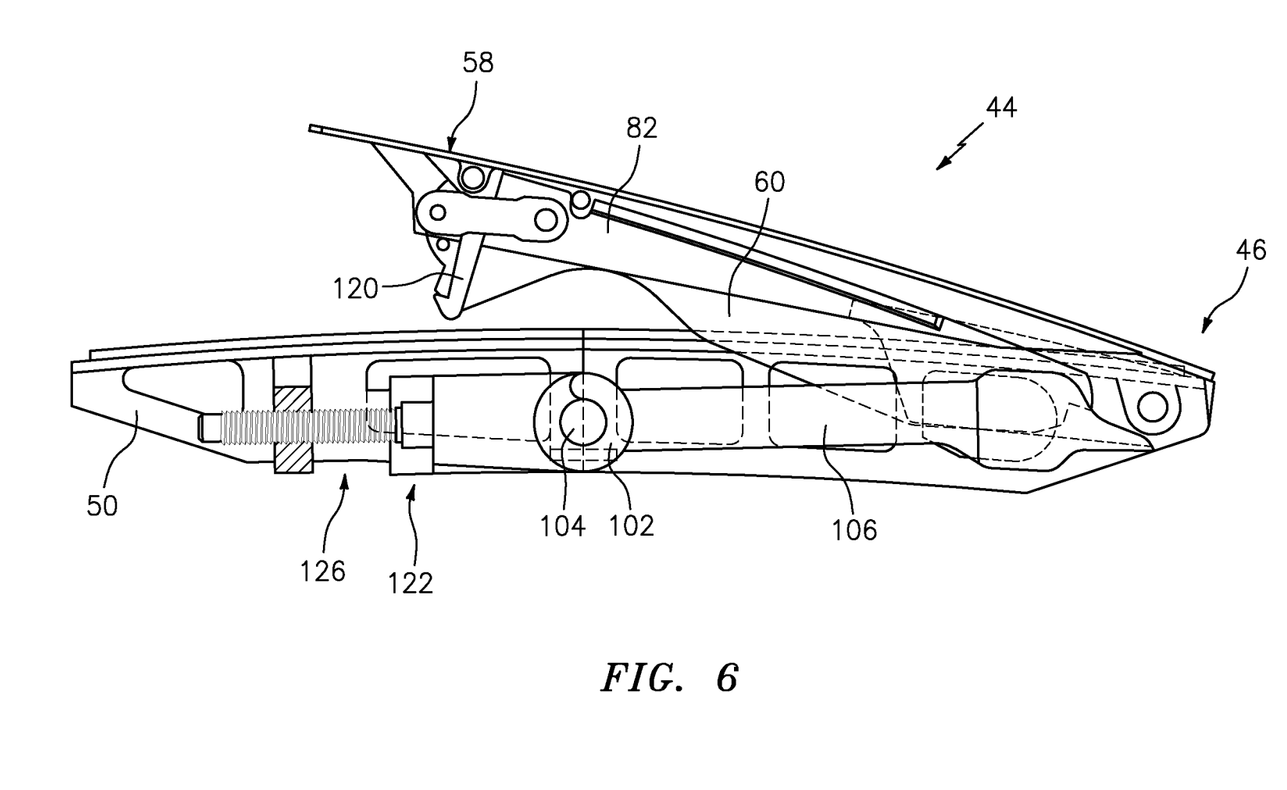
FIG. 6 illustrates a cross-sectional side view of the latch of FIG. 3 in a disengaged condition.

Referring to FIGS. 3, 4, and 6, the latch mechanism 56 may be configured to be collapsible so as to fit entirely within the latch housing 46. For example, the load pin 104 and the extension element 106 may fit between the portions 66, 68 of the first arm member 60 with the first arm member 60 in the second position. Similarly, the first arm member 60 may fit between the transverse walls 96 of the second arm member 82 with the second arm member 82 in the second position.

Figure 7A:
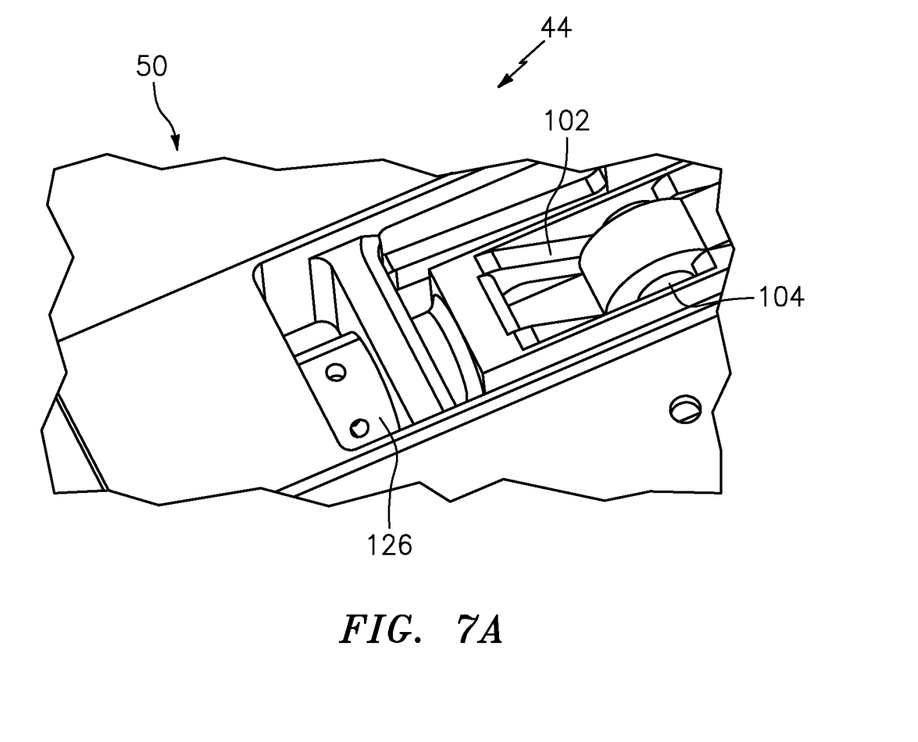
FIG. 7A illustrates an exterior view of a portion of the latch of FIG. 3.
Figure 7B:
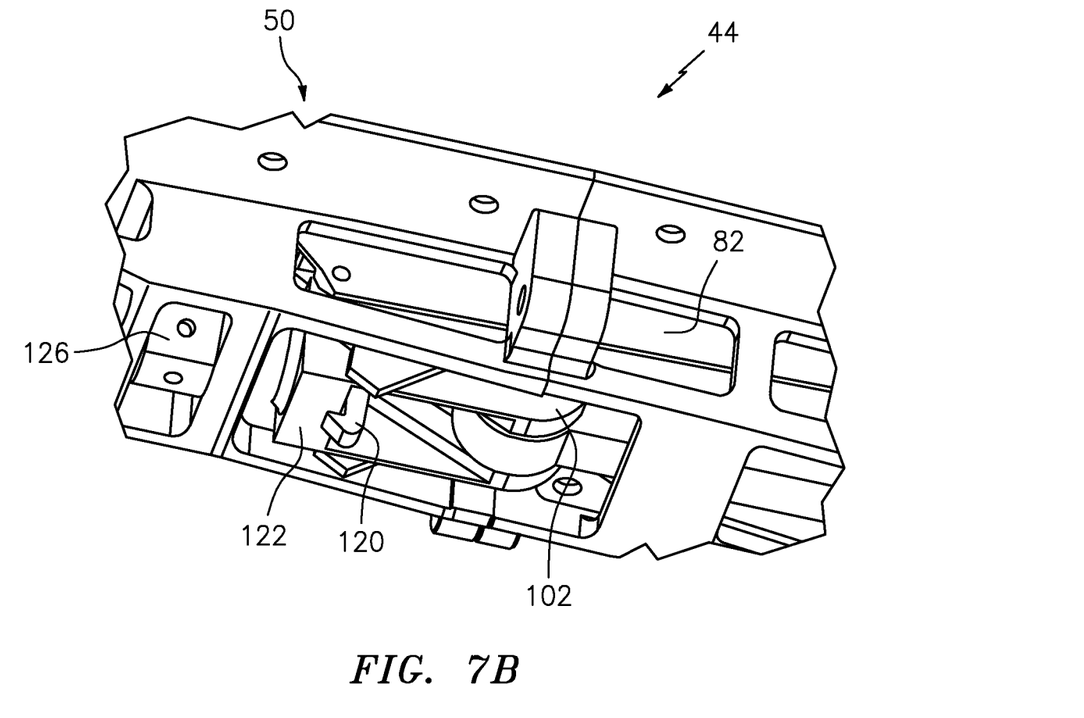
FIG. 7B illustrates an interior view of a portion of the latch of FIG. 3.
Figure 8A:
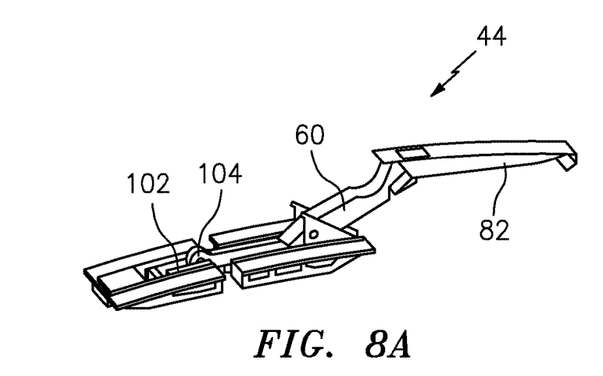
FIGS. 8A-G illustrate an exemplary sequence for engaging the latch of FIG. 3.
Figures 8B, 8C, 8E, 8F, 8G:
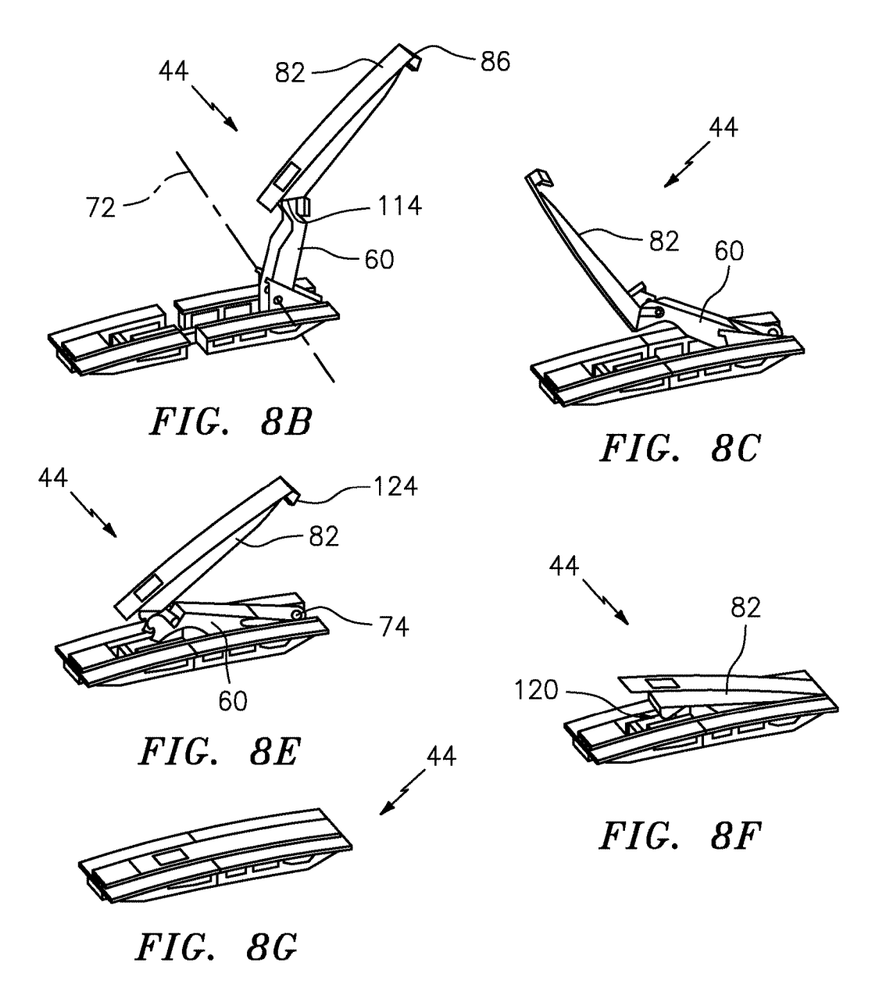
Figure 8D:
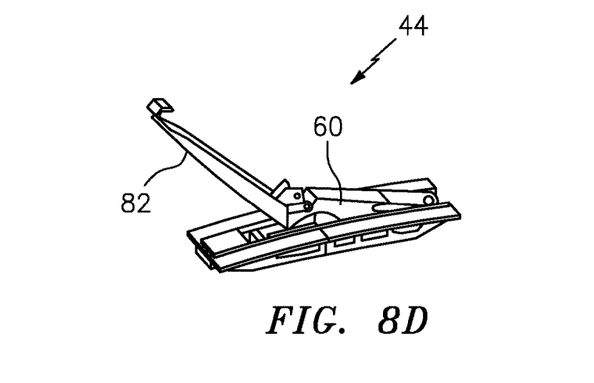

Referring to FIGS. 5, 6, and 7B, in some embodiments, the second arm member 82 may include a lock 120 configured to mate with a retaining surface 122 of the second housing portion 50 when the latch 44 is in the engaged condition. The lock 120 may be engaged or disengaged from the retaining surface 122 (e.g., rotated into or out of contact with the retaining surface 122) by releasing or pressing the trigger 58, respectively. The lock 120 may prevent the latch 44 from inadvertently opening during gas turbine engine 10 operation, for example, as a result of vibration.

In some embodiments, the latch mechanism 56 may include a baulking feature configured to alert an operator of the latch 44 that the latch 44 has failed to engage. For example, if the load pin 104 has failed to mate with the keeper 102, the extension element 106 may physically prevent one or both of the first arm member 60 from reaching the second position of the first arm member 60 and the second arm member 82 from reaching the second position of the second arm member 82. Thus, the lock 120 may be unable to engage with the retaining surface 122 as the operator attempts to place the latch 44 in the engaged condition. Further, the outer surfaces 98 of the transverse walls 96 may remain visible to the operator, thereby alerting the operator that the latch 44 has failed to engage. The extension of the second arm member 82 from the first arm member 60, in combination with the distinguishing outer surfaces 98, may further indicate a disengaged condition of the latch 44 by extending more prominently from the latch 44.

Referring to FIGS. 4 and 5, in some embodiments, the second arm member 82 may include a hook 124 disposed at the second end 86. The hook 124 may be configured to engage the pin 74 as the second arm member 82 is rotated to the second position. Accordingly, the combination of the lock 120 and the hook 124 may further prevent the latch 44 from inadvertently opening during gas turbine engine 10 operation, for example, as a result of vibration.

Referring to FIGS. 6, 7A, and 7B, in some embodiments, the second housing portion 50 includes an adjustment feature 126 configured to linearly adjust the position of the keeper 102 relative to the load pin 104. The adjustment feature 126 may be threadably engaged with the second housing portion 50. Accordingly, rotation of the adjustment feature 126 in a first direction may cause the keeper 102 to move in a direction towards the load pin 104. Conversely, rotation of the adjustment feature 126 in a second direction, opposite the first direction, may cause the keeper 102 to move in a direction away from the load pin 104. The adjustment feature 126 may be used to adjust the position of the keeper 102 (i.e., "rigging" the latch 44) with respect to the load pin 104 in order to, for example, adjust the preload of the latch 44 and/or to maintain an efficient aerodynamic gap between the closed cowl doors 34, 36. Where respective first and second cowl doors 34, 36 (see FIGS. 2A and 2B) require two or more latches, the adjustment feature 126 of the latch 44 may be adjusted to balance the load between the two or more latches. In some embodiments, the adjustment feature 126 may be accessed from a position adjacent an interior of the second housing portion 50 (see, e.g., FIG. 7B) and/or a position adjacent an exterior of the second housing portion 50 (see, e.g., FIG. 7A). In some embodiments, the adjustment feature 126 may be operated without opening the first and second cowl doors 34, 36 (e.g., from the position adjacent the exterior of the second housing portion 50).

Figure 9:
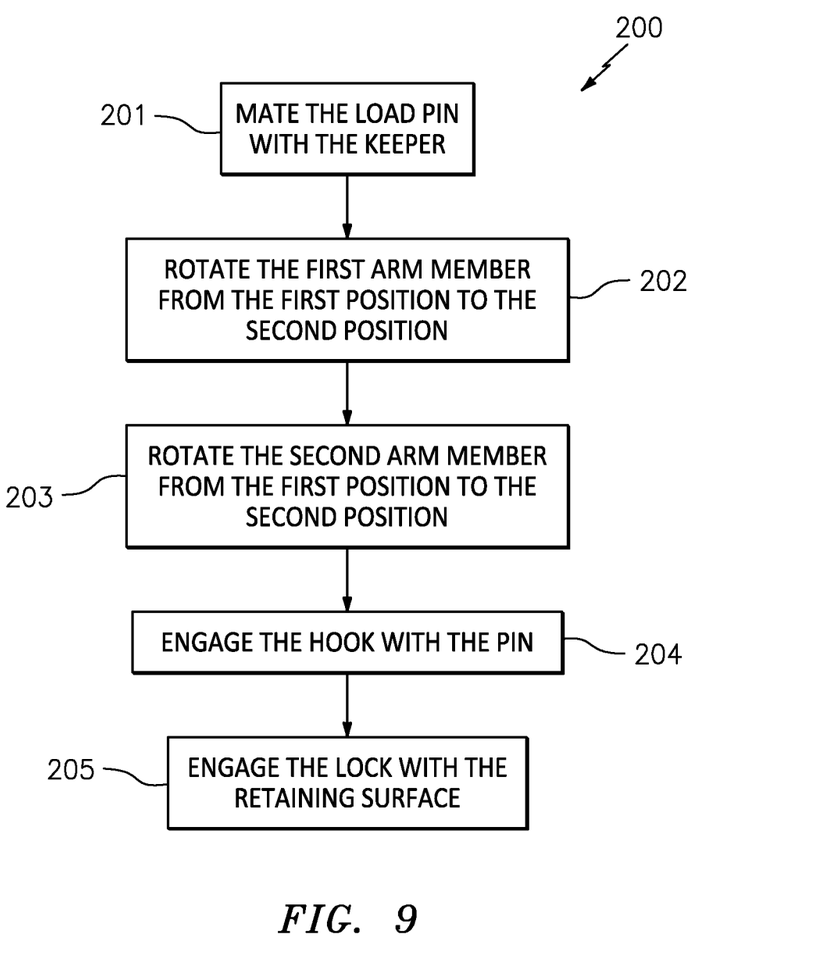
FIG. 9 is a flowchart depicting a method for engaging a cowl door latch.
Figure 10A:
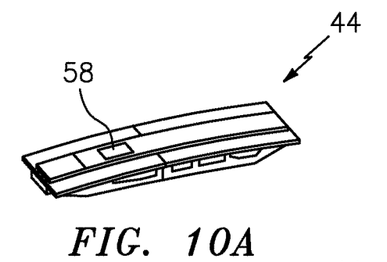
FIGS. 10A-G illustrate an exemplary sequence for disengaging the latch of FIG. 3.
Figure 10B:
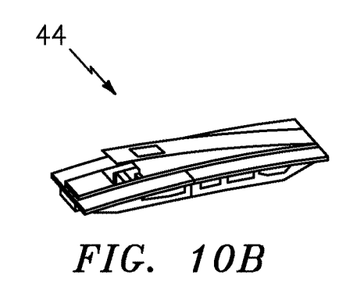
Figure 10C:
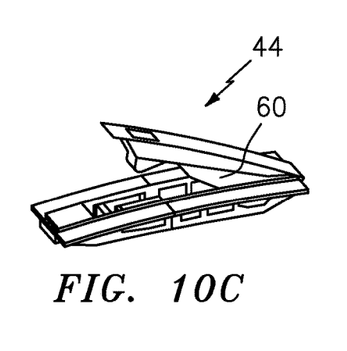
Figures 10D, 10E, 10G:
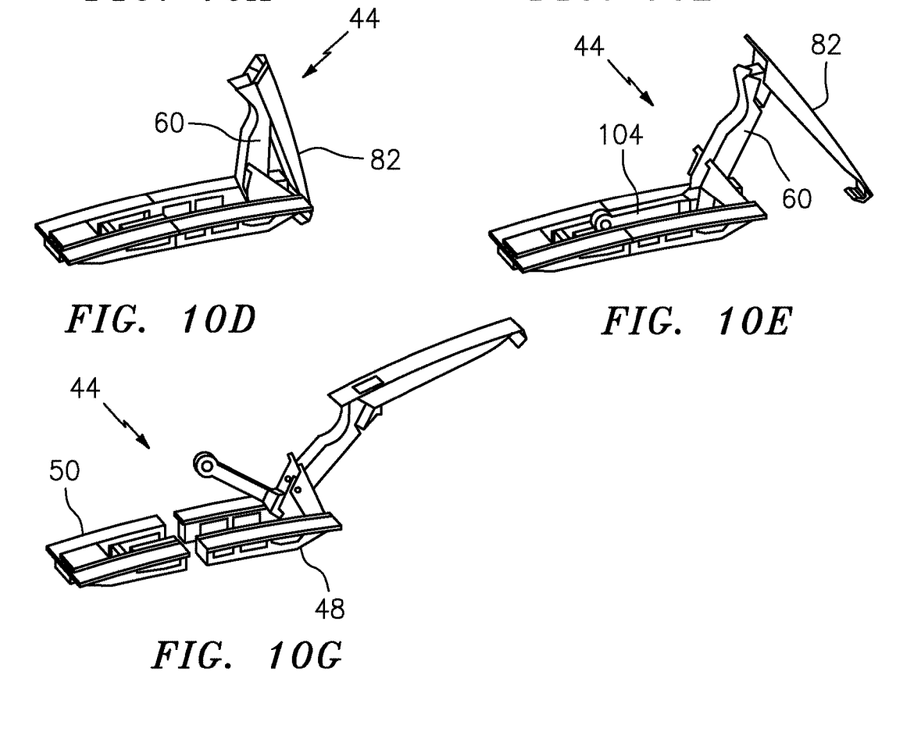
Figure 10F:
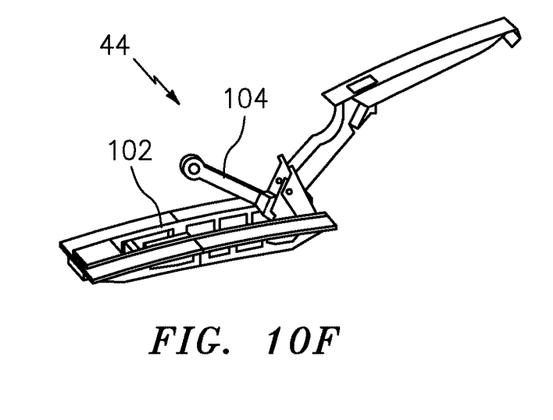

Referring to FIG. 9, an exemplary method 200 for engaging a latch, such as the latch 44, is shown. FIGS. 8A-G illustrate a corresponding sequence for engaging the latch 44. In step 201, the load pin 104 is mated with the keeper 102 (see, e.g., FIGS. 8A and 8B). In step 202, the first arm member 60 is rotated about the first axis 72 from the first position to the second position (see, e.g., FIGS. 8B-D). Rotation of the first arm member 60 from the first position to the second position may be effected by applying a force to the second end 86 of the second arm member 82 in the first position. The corresponding interaction between the second arm member 82 and the stop 114 causes the first arm member 60 to rotate from the first position to the second position. Rotation of the first arm member 60 from the first position to the second position thereby pulls the second cowl door 36 towards the first cowl door 34 (see FIGS. 2A and 2B). In step 203, the second arm member 82 is rotated from the first position toward the second position (see, e.g., FIGS. 8E and 8F). In step 204, the hook 124 is engaged with the pin 74 (see, e.g., FIGS. 8E and 8F). In step 205, the lock 120 is engaged with the retaining surface 122 (not shown, see FIG. 7B), thereby placing the latch 44 in the engaged condition (see, e.g., FIGS. 8F and 8G)

Figure 11:
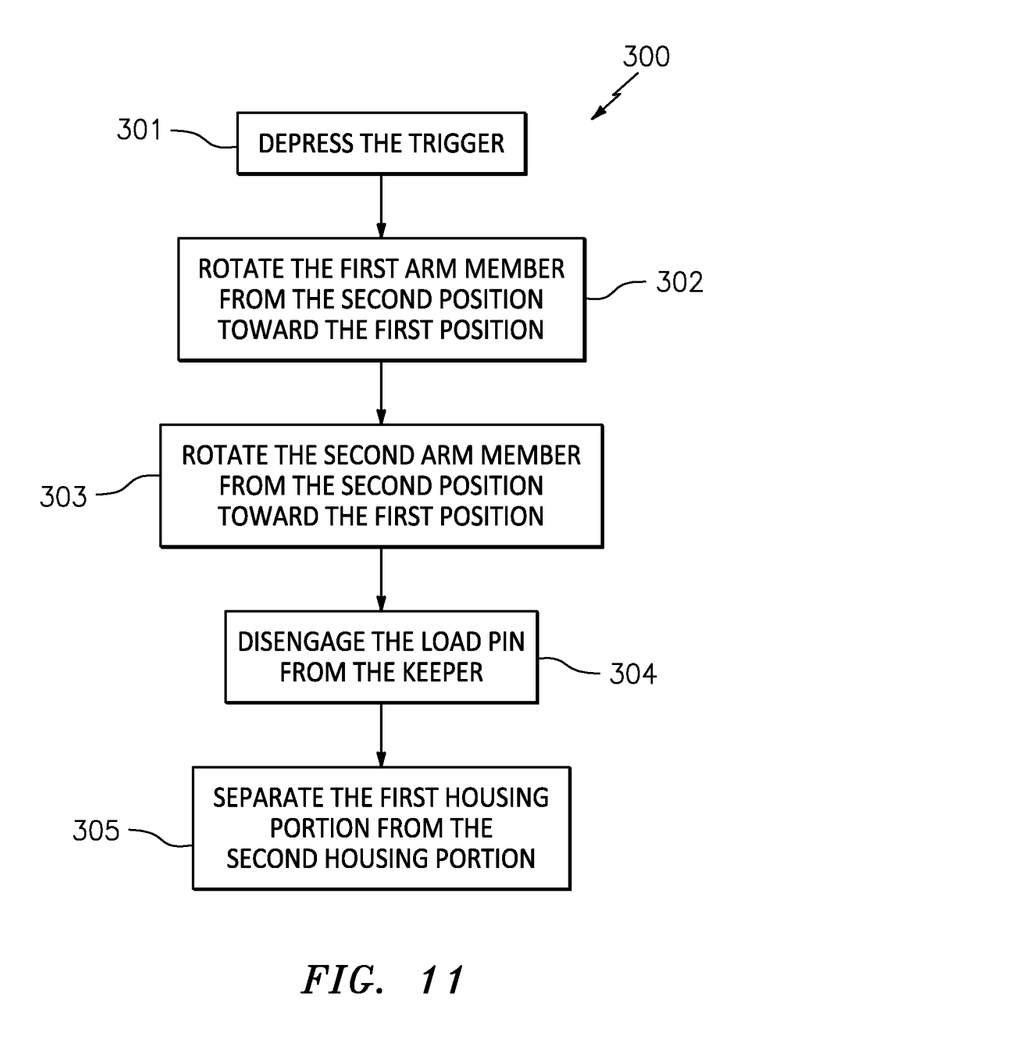
FIG. 11 is a flowchart depicting a method for disengaging a cowl door latch.

Referring to FIG. 11, an exemplary method 300 for disengaging a latch, such as the latch 44, is shown. FIGS. 10A-G illustrate a corresponding sequence for disengaging the latch 44. In step 301, the trigger 58 is depressed causing the lock 120 (not shown, see FIG. 6) to rotate out of engagement with the retaining surface 122 (not shown, see FIG. 7B) (see, e.g., FIG. 10A). In step 302, the first arm member 60 is rotated from the second position toward the first position (see, e.g., FIGS. 10B-10E). In step 303, the second arm member 82 is rotated from the second position toward the first position (see, e.g., FIGS. 10D and 10E). In step 304, the load pin 104 is disengaged from the keeper 102 (see, e.g., FIGS. 10D-10F). In step 305, the first and second housing portions 48, 50 are separated thereby opening the first and second cowl doors 34, 36 (see, e.g., FIG. 10G).

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A latch comprising:
   a latch housing comprising a first housing portion and a second housing portion separable from the first housing portion, the second housing portion comprising a keeper;
   a first arm member in rotational communication with the first housing portion, the first arm member configured to rotate about a first axis between a first position and a second position;
   a second arm member in rotational communication with the first arm member, the second arm member configured to rotate with respect to the first arm member between a third position and a fourth position; and
   a latch load pin in rotational communication with the first arm member about a second axis, the latch load pin configured to mate with the keeper with the first arm member in the first position;
   wherein the second arm member in the third position is configured to be fixed relative to the first arm member as the first arm member rotates from the first position toward the second position; and
   wherein the first arm member is connected to the first housing portion with a connection member, the connection member in rotational communication with the first arm member about the first axis and in rotational communication with the first housing portion about a third axis.

2. The latch of claim 1, wherein the first arm member includes a first end and a second end opposite the first end, the first arm member coupled to the second arm member at the second end and the latch load pin at the first end.

3. The latch of claim 2, wherein the first axis is between the second axis and the second end of the first arm member along a length of the first arm member.

4. The latch of claim 3, wherein the first, second, and third axes are substantially parallel.

5. The latch of claim 1, wherein the first arm member includes a stop configured to prevent rotation of the second arm member with respect to the first arm member past the third position in a direction of rotation away from the fourth position of the second arm member.

6. The latch of claim 1, wherein the second arm member includes a lock configured to mate with the second housing portion when the second arm member is in the fourth position.

7. The latch of claim 1, wherein the keeper is linearly adjustable between a first keeper position and a second keeper position with respect to the first housing portion.

8. The latch of claim 1, wherein the first arm member has a first direction of rotation from the first position to the second position of the first arm member and the second arm member has a second direction of rotation from the third position to the fourth position of the second arm member and the first direction of rotation is opposite the second direction of rotation.

9. The latch of claim 1, wherein the second arm member has a first end and a second end opposite the first end, the second arm member in communication with the first arm member at the first end.

10. The latch of claim 9, wherein with the first arm member in the first position and the second arm member in the third position, the second end of the first arm member is a first length from the second axis and the second end of the second arm member is a second length from the second axis greater than the first length.

11. A nacelle for a gas turbine engine having an axial centerline, the nacelle comprising:
    a first cowl door rotatable about a first hinge;
    a second cowl door rotatable about a second hinge; and
    a latch configured to secure the first cowl door to the second cowl door when the latch is in an engaged condition, the latch comprising:
      a latch housing comprising a first housing portion and a second housing portion separable from the first housing portion, the first housing portion mounted to the first cowl door and the second housing portion mounted to the second cowl door, the second housing portion comprising a keeper;
      a first arm member in rotational communication with the first housing portion, the first arm member configured to rotate about a first axis between a first position and a second position;
      a second arm member in rotational communication with the first arm member, the second arm member configured to rotate with respect to the first arm member between a third position and a fourth position; and
      a latch load pin in rotational communication with the first arm member about a second axis, the latch load pin configured to mate with the keeper with the first arm member in the first position;

wherein the second arm member in the third position is configured to be fixed relative to the first arm member as the first arm member rotates from the first position toward the second position; and wherein the first arm member is connected to the first housing portion with a connection member, the connection member in rotational communication with the first arm member about the first axis and in rotational communication with the first housing portion about a third axis.

12. The nacelle of claim 11, wherein the load pin is configured to pull the second housing portion towards the first housing portion as the first arm member rotates from the first position to the second position.

13. The nacelle of claim 11, wherein an exterior surface of the second arm member forms a portion of an exterior surface of the nacelle when the latch is in the engaged condition.

14. The nacelle of claim 11, wherein the second arm member includes a lock configured to mate with the second housing portion when the second arm member is in the fourth position.

15. The nacelle of claim 14, wherein the lock is configured to mate with the second housing portion when the second arm member is in the fourth position and the load pin is mated with the keeper.

16. The nacelle of claim 11, wherein the keeper is linearly adjustable between a first keeper position and a second keeper position with respect to the first housing portion.

17. The nacelle of claim 16, wherein the second housing portion further comprises an adjustment feature in communication with the keeper, wherein the adjustment feature is rotatable between a first adjustment position and a second adjustment position and rotation of the adjustment feature from the first adjustment position to the second adjustment position moves the keeper from the first keeper position to the second keeper position.

18. The nacelle of claim 16, wherein the adjustment feature is configured to be operated from both of a first position adjacent an exterior of the second housing portion and a second position adjacent an interior of the second housing portion.

19. A method of engaging a cowl door latch, the method comprising:

mating a load pin with a keeper;

rotating a first arm member about a first axis of a first housing portion from a first position to a second position, the first arm member in rotational communication with the load pin, rotating a second arm member with respect to the first arm member from a first third position to a fourth position;

wherein the second arm member is in rotational communication with the first arm member and the second arm member is fixed relative to the first arm member as the first arm member rotates from the first position toward the second position; and wherein the first arm member is connected to the first housing portion with a connection member, the connection member in rotational communication with the first arm member about the first axis and in rotational communication with the first housing portion about a third axis.

* * * * *